United States Patent Office 2,824,200
Patented Feb. 18, 1958

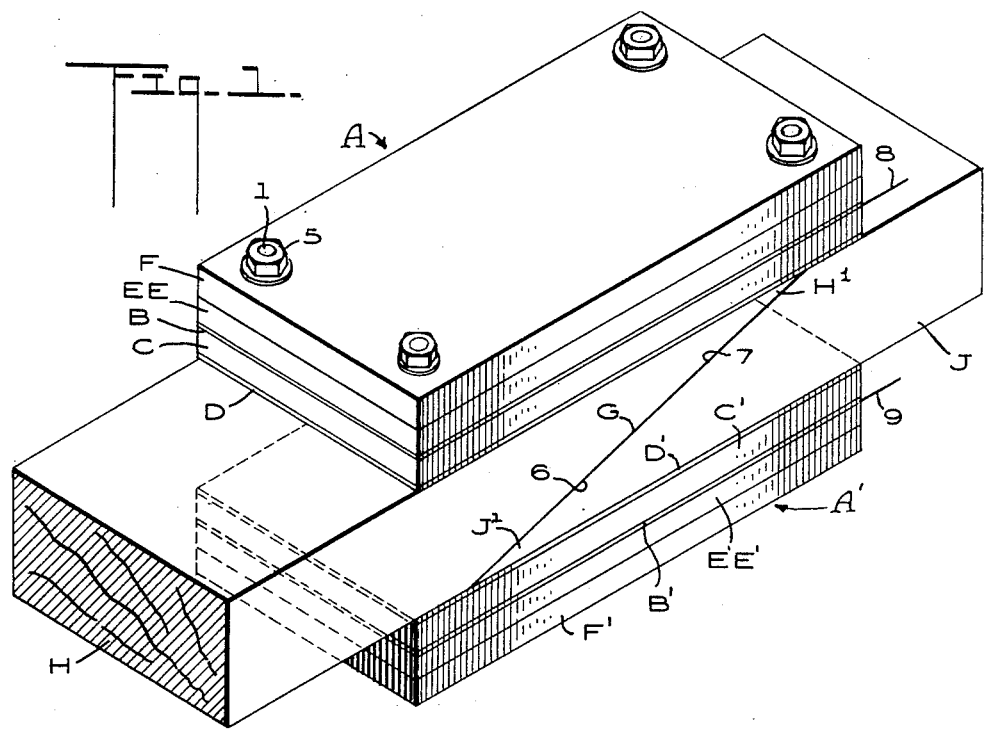
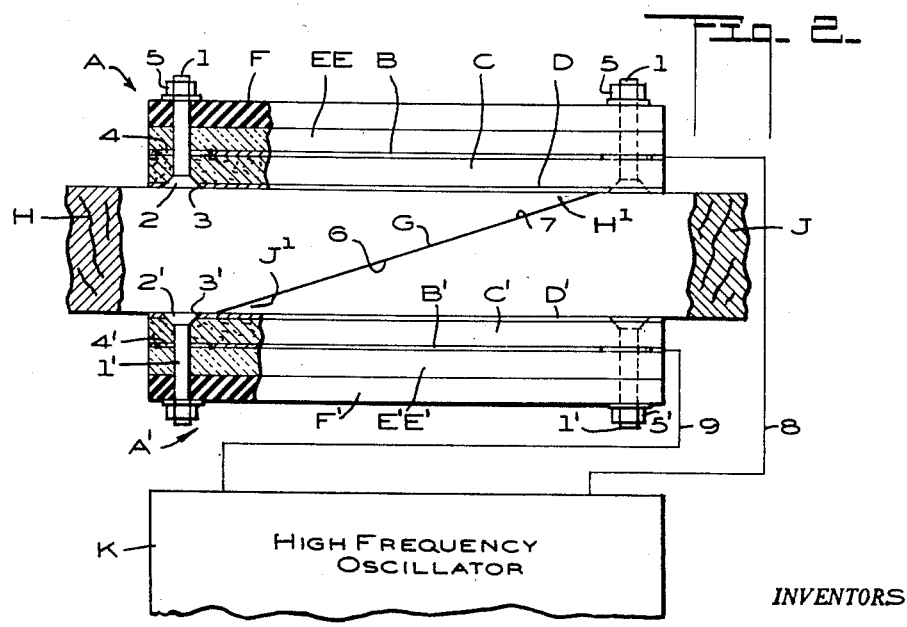

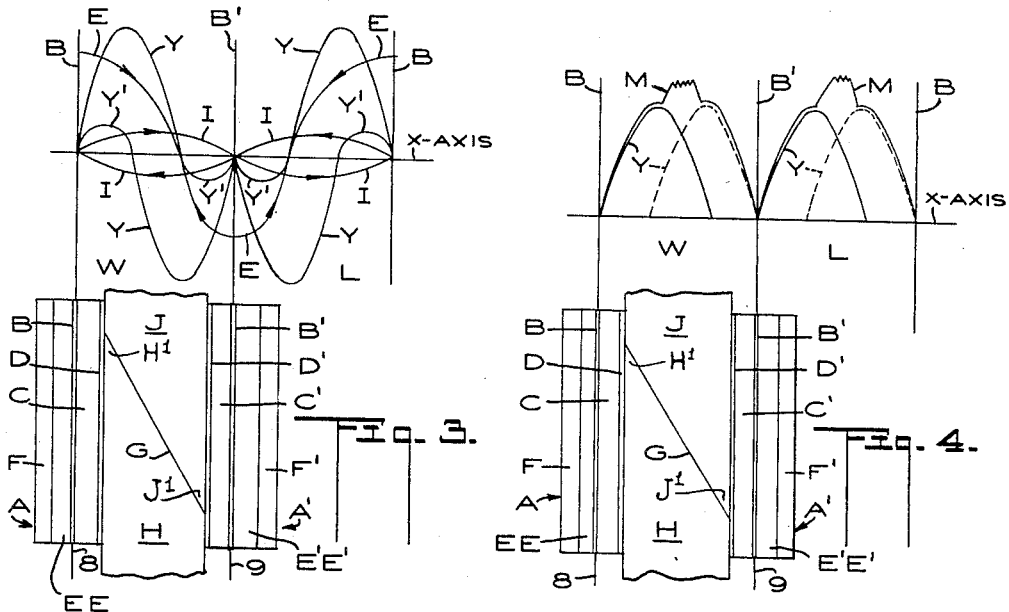
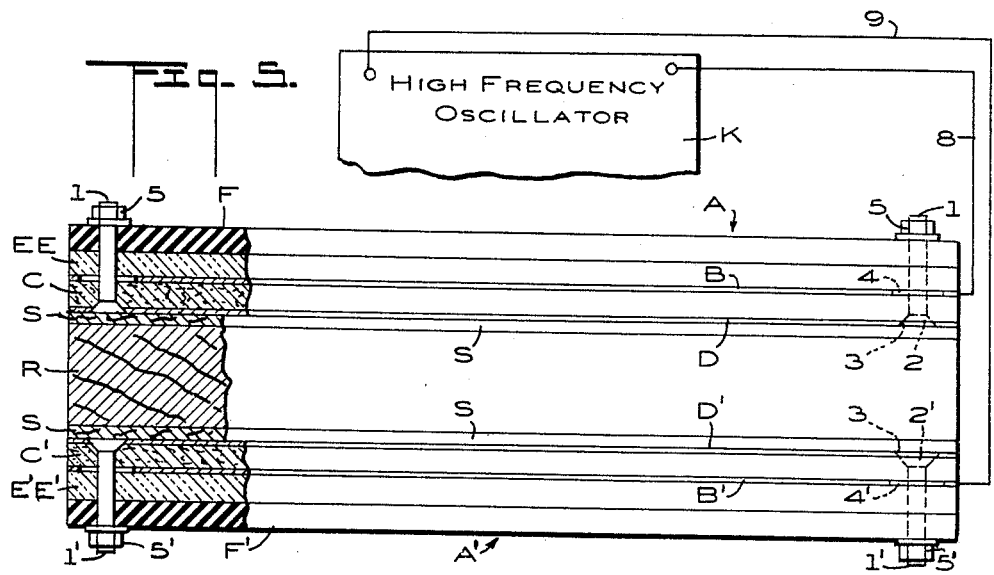
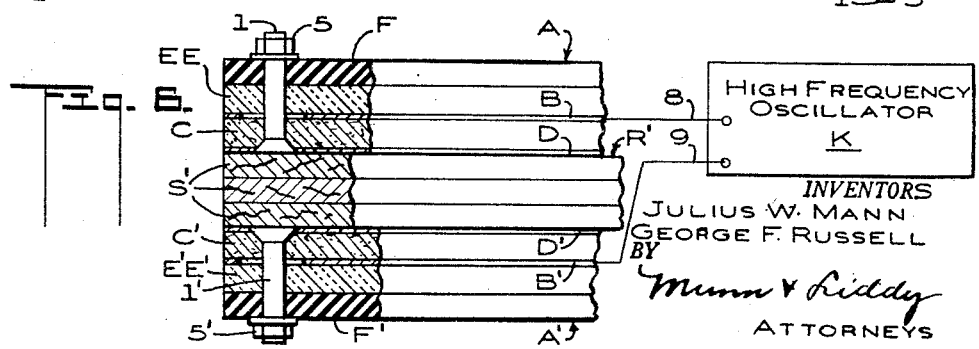

2,824,200

COMPOSITE ELECTRODE HEAT STORAGE APPLICATOR

Julius W. Mann and George F. Russell, Tacoma, Wash.

Application March 18, 1954, Serial No. 417,068

4 Claims. (Cl. 219—10.53)

In our Patent No. 2,599,850 on Process of Controlling and Placing of R. F. Heat in a Dielectric, issued June 10, 1952, we described and disclosed certain processes of controlling heat placement in dielectric materials for the treatment of differing types of loads by peaking the heating effect at the center, by evening out its distribution throughout the package, and by separating the heat peaks at the edges of the material. For the purpose described in Patent 2,599,850, the application of the processes have proven very effective on loads of differing thicknesses and varying dielectric constants.

We have found that two problems arise in the treating of wood products by dielectric high frequency heating which border closely on the use of principles disclosed, but differ materially from the methods of application disclosed in our Patent 2,599,850; namely, the bonding of scarfed joints and the adhesion of thin veneer face stock to core stock. We have discovered a novel method of applying a high frequency field of force to the curing of resin adhesive in wood laminations of the two types just mentioned, through a unique and new composite electrode heat storage applicator and particularly well adapted to this type of H. F. heating.

The feather edges or tips of scarfed joints often times do not adhere firmly to the stock of the adjoining piece when pressed together and exposed to a high frequency field of force through ordinary electrodes placed above and below the scarfed joint. When the two members of a scarfed joint are glued, the fibres of the tips lie furthest removed from the neutral axis of the joint, and are therefore subjected to the greatest strain when any shearing action takes place as compared to that of the fibres of any other layer of the material that lies between the edges and the center axis or plane. It is, therefore, imperative that the feather edges of the scarfed joint be pressed thoroughly and firmly bonded to the opposing member of the scarfed piece during the H. F. bonding of the joint.

In the ordinary application of the high frequency field to bonding scarfed joints, use of the principles described in our Patent 2,599,850, show advantages in spreading the R. F. field wide by inserting cauls on each side of the piece being bonded. However, the squeeze-out glue sticks to the separating cauls and causes other problems in setting up the work.

We have discovered that by making each caul, a part of its associate live electrode, and by placing a metal sheet or idling electrode on the outer surface of the caul and parallel to the flat live metal electrode, these disadvantages disappear when the idling electrode is applied directly to the scarfed joint. Moreover, when transite or other heat-retaining dielectric such as asbestos is used as the material for the caul and is placed between the live electrode and the idling electrode, heat will be retained in the caul and in the idling electrode, and the idling electrode when applied directly to the tip of the scarf joint, will heat the tip and the glue by conduction in addition to the heat applied by the R. F. field. The glue at the center of the scarf joint will be heated primarily by the R. F. field when the two applicators made up in the manner just mentioned are applied to opposite sides of the joint and the metal plates or idling electrodes contact the tips of the joints. The live electrodes are covered on one side by the high loss dielectric and by the outer metal plate or idling electrode, while the other side of the live electrodes are generally supported and covered by a layer of heat insulation and by an insulating support.

The voltage gradient is less marked at the plane of the idling electrodes and therefore there will be less tendency for arcing. This will be explained more in detail in the description of the operation of the applicators. An added advantage of operating the applicators while the outer plates or idling electrodes are hot in bonding scarf joints, occurs in setting the glue hard at the feather edges, and almost immediately on contact. The heated idling electrodes will also prevent any condensation forming thereon. The idler electrode elements D and D' are separated from the live electrodes B and B' by the dielectric material C and C'. The idler electrodes are elevated in temperature by the conduction of heat from the layers C and C' which in turn are heated by the R. F. field. There is no tendency for moisture condensation to form on the heated idling electrodes. Any tendency for arcing between the idling electrodes due to moisture condensation forming thereon is therefore eliminated.

Scarf joints are difficult to prepare from a machining standpoint and near perfection is not usually attained. By near perfection, we mean that the faces of the scarf when fitted together, approach 100% uniform contact therebetween. It has been found that very rigid plate electrodes, cannot conform to the usual inequalities present in the scarf assembly. Therefore, the applicator system we set forth in this case is constructed in a manner to provide some resiliency so as to conform to the inequalities of the two faces of the scarf joint. In this way, a greater area of contact between the two scarf faces results, and a more perfect bonding of the joint results.

Other objects and advantages will appear in the following specification, and the novel features of the device will be particularly pointed out in the appended claims.

Our invention is illustrated in the accompanying drawings forming a part of this application, in which:

Figure 1 is a perspective view of a pair of our improved composite electrode heat storage applicators, placed on opposite sides of a scarf joint;

Figure 2 is a side elevation of Figure 1, and shows portions of the two applicators in section;

Figure 3 shows graphs of current, voltage and power curves;

Figure 4 shows by graph, heating in the capacitance;

Figure 5 is a side elevation of a pair of our applicators applied to opposite sides of core stock covered with sheets of thin veneer; and Figure 6 is a side elevation of a pair of our applicators applied to two outer surfaces of plywood in which the glue planes are to be set.

While we have shown only the preferred form of our invention, it should be understood that various changes or modifications may be made within the scope of the appended claims without departing from the spirit and scope of the invention.

In carrying out our invention, we provide two similar composite electrode heat storage applicators and a detailed description of one will suffice for both. The reference characters applied to the applicator not described, will be the same, but primed so as to distinguish between the two applicators.

Figures 1 and 2 show the applicator A as comprising a live electrode B which is flat and rectangular in shape although we do not wish to be limited to any particular size nor shape. In our copending application on an arcuate, cylindrical and cup-shaped composite R. F. electrodes, Ser. No. 417,069, filed March 18, 1954, we disclose a cylindrical and a cup-shaped type as well as an arcuate type. On one face of the live metal electrode B, we dispose a layer C of a high loss dielectric, such as asbestos or transite and the outer face of the layer C is covered by a metal plate D or idling electrode which does not act as an electrode, nor is it electrically connected to the live electrode B.

On the opposite side of the flat electrode B from the layer C, we mount a layer E—E of insulating material and this may comprise a layer of asbestos. The layer E—E is supported by an insulated support F which may be made of wood or plastic or the like. All of the members B to F, inclusive, are removably secured together by bolts 1, or other suitable fastening means. The heads 2 of the bolts 1 are conical in shape and are received in conical openings 3, provided in the metal plate D so that the bolt heads will lie flush with the outer surface of the metal plate D, or idling electrode.

In Figure 2 it will be noted that the live electrode B has large openings 4 through which the shank of the bolt 1 extends. The diameter of the bolt shank is considerably less than the diameter of the opening 4 so that there will be no contact between the bolt shank and the live electrode B. In this way the metal plate D is connected to the applicator A and forms a part thereof without being electrically connected to the live electrode B. The bolts 1 extend through all of the members B to F, inclusive, and nuts 5 are threaded onto the bolts for holding all of the members together as a unit.

Figures 1 and 2 illustrate the members B to F, inclusive, as all being rectangular in shape and of the same area. The applicators A and A' are placed on opposite sides of a scarf joint, indicated generally at G. One member H has an inclined surface 6 and this surface contacts with another inclined surface 7 provided on a second member J that is to be bonded to the member H by the scarf joint G. The metal plates D and D' contact opposite faces of the scarf joint and overlie the tip H1 of the member H and the tip J1 of the member J. Glue or other adhesive is placed between the surfaces 6 and 7 of the scarf joint and the glue will be set by the H. F. current flowing in the applicators A and A' in the manner now to be described. Figure 2 shows wires 8 and 9, leading from the live electrodes B and B', respectively, to a high frequency oscillator K.

In our Patent 2,599,850, we show a graph of a power curve when the current and voltage curves are partially in phase. Such a graph is illustrated in Figure 3 of the present drawings. The standing wave distribution curves Y are shown when the current I and the voltage curve E are brought more into phase by the placing of an energy-consuming dielectric, i. e., the scarf joint G, between the two applicators A and A'. The small loops Y' in Figure 3, are the negative power loops. A standing wave of current and voltage is the result of a reflected state. The power peaks in a half cycle of energy must also stand.

It will be seen from Figure 3, that much more power is consumed in the circuit during the first quarter than is returned to the generator in the second quarter of the cycle, and also more is consumed in the circuit during the third quarter, than is returned to the generator in the fourth quarter of the cycle. The radio circuit of the high frequency oscillator K is preferably that one described and claimed in our Patent 2,506,158, issued May 2, 1950, on a standing wave in a radio frequency circuit. It is possible to use a radio circuit that is a single ender. We therefore do not wish to be confined to either a single ender or a double ender since the applicators will operate whether one type of circuit is used or the other.

An energy-consuming dielectric, such as the scarf joint G, placed in the capacitance W, see Figure 3, will bring the voltage and current curves more into phase and alter the positions of the crests of the power curves Y and Y'. In Figure 4 the power distribution curves Y, lying below the x-axis, shown in Figure 3, are swung through an arc of 180°, and are indicated by the dotted lines. The resultant heat placement in the capacitance W and in the inductance L are indicated by the heat curves M.

In our Patent 2,599,850, we show that the electric field in a standing wave system is non-uniform and therefore the placement of maximum peak conversion will be located on each side of a median point lying between the electrodes B and B', and between which the dielectric load, i. e., the scarf joint G, is positioned. It has been shown that little or no energy is released at the surfaces of the electrodes. Consequently, when a scarf joint G is set, the tips H1 and J1 will not be set if the electrodes B and B', contact the opposed sides of the joint. The failure results from insufficient rise in temperature because of the lack of heat energy adjacent the electrodes and because of heat losses by conduction and radiation.

The inclusion of the high loss, heat resistant layers C and C', spaces the electrodes B and B' from the scarf joint and locates the peak energy conversion more nearly at the plane of the scarf tips H1 and J1. Also the heated plates D and D' will heat the scarf tips by direct contact therewith.

It will be seen from Figure 4 that the distribution or power curves Y in the capacitance W, will lie somewhat in the heat storage layers C and C', of the applicators A and A', and therefore these layers will heat up because they are composed of a heat-retaining dielectric, such as asbestos. Moreover, the high loss dielectric C and C' will not only heat up, but the plates D and D' will also be heated and will heat the tips H1 and J1 by conduction due to their direct contact with these tips.

The tendency for any arcing between the live electrodes B and B' and the wet glue that might contact the plates D and D' is practically eliminated for two reasons. In the first place, the plates D and D' or idling electrodes are kept heated to an elevated temperature, and any glue striking these, will be polymerized almost instantaneously and therefore will not adhere to the metal. Secondly, in a standing wave system, the electric strain is greatest in the region of the potential state; namely, the voltage antinodes. In Figure 3 the voltage curve E shows that the highest voltage strain is at the electrodes B and B'. The voltage drops to zero where the voltage curve E crosses the x-axis. The plates D and D' are spaced from the electrodes B and B' by the thickness of the high loss dielectric layers C and C'. Therefore the voltage potential of the curve E will not be so great at the plates D and D' as it is at the electrodes B and B', because the voltage curve is nearer the x-axis and therefore nearer to zero potential.

The paltes D and D' physically contact the sides of the members H and J, and any squeeze-out glue from the scarf joint G will be spaced from the electrodes B and B' and will be in a lower voltage field with the consequent less opportunity for arcing. The joint surfaces 6 and 7 are spaced away from the points of high electric strain and the tendency to arc is reduced to negligible levels.

The center of the scarf joint will have its glue set by the radio frequency field of force when the applicators A and A' are applied to the joint as in Figure 2, and the H. F. oscillator is turned on. Figure 4 illustrates schematically how the heat curve M will set the glue at the center of the scarf joint G because the high point of the heat curve is approximately midway between the two electrodes B and B'.

However, the inclusion of the high loss heat resistant layers C and C' on each side of the scarf joint G, locates the peak of energy conversion more nearly at the planes of the scarf tips H1 and J1. The thickness of the layers C and C' are so regulated as to place the maximum heat at the planes of the scarf tips. The heat stored in the layers C and C', when it reaches several hundred degrees Fahrenheit, will heat the metal plates D and D', and these will contact the scarf tips and cause a reversal of heat flow in these tips. Normally the heat would be radiated outwardly from the tips because of the central heating by the R. F. field at the center of the scarf. Now the plates D and D' are so hot that by conduction, the heat will be driven inwardly from the tips. The tips are therefore the first portions to have their glue set. In fact, the surface temperatures of the scarf joint are usually higher than the center of the joint. Under some conditions, enough heat energy is stored in the dielectric substance C and C' to enable a scarf joint to be set by the stored heat alone and with the H. F. electric field turned off.

One novel feature of the invention is the provision of a high loss, fireproof material, such as transite or asbestos, forming the layers C and C', and this material constituting a portion of the dielectric path between the electrodes B and B'. The scarf joint G is sandwiched between the high loss dielectric layers of material, as is shown schematically in Figures 3 and 4. The layers C and C' act as cauls and also store heat so as to heat the metal plates D and D' that acutally contact the tips H1 and J1 of the scarf joint. The metal plates D and D' also prevent wear taking place on the layers C and C' because the metal plates contact with the scarf joint.

The electrodes B and B' are supported and enclosed in resilient insulating members C and C' on one side and EE and E'E' on the other side, plus the layers F and F' that contact the layers EE and E'E'. The layers EE and E'E' are merely for the convenience of isolating the bolts 1 from the live metal electrodes B and B' to prevent galvanic contact between the plates B and D, and the plates B' and D'. A novel feature results in the placing of the high loss dielectric layers C and C' between the electrodes B and B' and the work. By this arrangement of parts, we combine the control and placement of energy in a dielectric such as the scarf joint, to a high frequency field of force, with the self-heating and the storage of heat in the applicator components themselves.

The advantage of such an arrangement of parts lies in the added control over the placement of heat energy in the scarf joint or other dielectric, even to the extent of reversing the flow of heat at the surface layers of the dielectric load and driving the heat inwardly rather than outwardly. The dielectric is internally heated by the two-point R. F. heating in the one-half standing wave of the electric field. The dielectric at the same time is externally heated by direct contact with the stored heated material of the two applicators. The composite heating by internal and external means results in more uniform heating. The selection and thickness of the heat-retaining layers C and C', depends upon the load and power factor. The applicators A and A' have their plates D and D' bear against the tips H1 and J1 for holding them in place during the setting of the glue.

In Figure 5, we show our applicators A and A' applied to core stock which is to have thin veneer faces bonded thereto. The core stock is indicated at R, and the layers of veneer are shown at S. The applicators A and A' in Figure 5 are identical to those shown in Figures 1 and 2, and like characters will be applied to the same parts in Figure 5 and no additional detailed description of the applicators A and A', need be given.

The high loss dielectric material forming the layers C and C' will be heated and in turn will heat the plates D and D' or idling electrodes. Since the plates contact directly with the veneer layers S, these layers will be heated by conduction and the adhesive lying between the veneer layers S and the core R, will be set. A perfect bonding of the veneer layers to the core results. Figure 5 shows the applicators A and A' electrically connected to the H. F. oscillator K by the wires 8 and 9.

It is best to preheat the high loss dielectric layers C and C' and the plates D and D' by connecting the applicators A and A' to the H. F. oscillator K, before placing a dielectric such as the scarf joint G or the veneered core stock between the two applicators. The idling electrodes, i. e., the metal plates D and D' are not electrically connected to the live electrodes B and B', and are heated by direct contact with the heated layers C and C'.

Bonding veneer layers to the stock is accomplished by the two point R. F. heating in the core R, and this heat tends to travel to the outer surface of the core. The plates D and D' are heated by the same R. F. field and these plates contact directly with the veneer layers to heat them and drive the heat into the material to set the adhesive layers that lie between the veneer layers and the core. It takes only a few seconds to bond the veneer layers to the core with high frequency and using the herein described applicators. We have found that heating the veneer by heated plattens alone and without R. F. heating, requires from one to four minutes to set the same glue plane.

The internal and the external heating of the dielectric material is accomplished simultaneously by using our applicators. The radio frequency field is created between the two live electrodes B and B' and accomplishes the internal heating. The layers C and C' are heated by a portion of the radio frequency field and these layers will heat the idling electrodes D and D' by conduction. The idling electrodes heat the outer surfaces of the dielectric material by direct contact therewith.

In Figure 6, we show the R. F. applicators A and A' applied to opposite faces of plywood indicated generally at R'. We show the plywood as consisting of three layers S' with glue applied between the layers. It is obvious that the number of layers can be changed.

The live electrodes B and B' are connected by the wires 8 and 9 to the high frequency oscillator K in Figure 6. The idling electrodes D and D' contact with the outer surfaces of the plywood R' and they are heated by the layers of high loss dielectric C and C'. The layers C and C' serve the additional function of spacing the live electrodes B and B' from the plywood.

The operation of the R. F. applicators A and A' on the plywood R', will be the same as that on the core stock R and veneer layers S. The radio frequency lines of force will pass substantially vertically through the glue planes that lie between the plywood layers S'. The glue is set and the layers of plywood will be bonded together.

We claim:

1. A composite electrode heat storage applicator comprising: a live electrode adapted to be connected to a source of high frequency current; a layer of high loss dielectric material applied to one side of the electrode; an idling electrode covering the exposed face of the dielectric material and being secured to the live electrode while being free of any electrical connection with the live electrode; said idling electrode being adapted to contact with the surface of dielectric work that is to have a high frequency field applied thereto by the live electrode; the layer of dielectric, spacing the live electrode from the dielectric work and lying within the high frequency field so as to store heat generated by the high frequency field; said dielectric layer delivering this heat by conduction to the idling electrode so that the heat can be applied by conduction directly to the surface of the dielectric work, contacted by the idling electrode; and a layer of insulating material covering the other side of the live electrode.

2. A pair of composite electrode heat storage applicators: each comprising a flat live electrode adapted to be connected to a source of radio frequency current for forming a radio frequency field therebetween; a layer of high loss dielectric material applied to one face of each live electrode; an idling electrode covering the exposed face of each layer of dielectric material and being free of any electrical connection with the live electrode; said applicators being disposed on opposite sides of dielectric work with the idling electrodes of each, contacting opposed faces of the work so as to space the live electrodes from the work; said high loss dielectric material lying within the high frequency field; whereby the dielectric layers of the applicators will store heat generated by the radio frequency field and will deliver the heat to the idling electrodes by conduction so that the heat can be applied directly by conduction to the surface of the work, contacted by the idling electrodes; the interior of the dielectric work being heated by the R. F. field; and a layer of insulating material covering the other face of each of said live electrodes.

3. A pair of composite R. F. electrode heat storage applicators, each comprising: a heat-retaining electrode and a live electrode evenly spaced apart by a high loss dielectric interposed therebetween; the pair of composite applicators being adapted to receive dielectric work therebetween with the heat-retaining electrodes physically contacting the work to heat the latter by conduction; the live electrode in each applicator being connectible with a high frequency alternating current source and being galvanically isolated from the heat-retaining electrode; the high loss dielectric in each applicator being heated by the high frequency field generated by the live electrodes and transferring this heat to the heat-retaining electrodes by conduction.

4. A composite electrode comprising an idling electrode and a live electrode paralleling each other; a uniformly thick layer of a fixed high loss dielectric material interposed between the two electrodes; and means for holding the two electrodes and the layer of high loss dielectric material in intimate contact with each other while preventing galvanic connection between the two electrodes; said live electrode being connectible to a source of high frequency alternating current.

References Cited in the file of this patent

UNITED STATES PATENTS

| | | |
|---|---|---|
| 2,413,003 | Sherman | Dec. 24, 1946 |
| 2,436,732 | Rowe | Feb. 24, 1948 |
| 2,463,054 | Quayle et al. | Mar. 1, 1949 |
| 2,521,797 | Klingaman | Sept. 12, 1950 |
| 2,526,697 | Scott | Oct. 24, 1950 |
| 2,565,161 | Wilmotte et al. | Aug. 21, 1951 |